United States Patent [19]
Fu et al.

[11] Patent Number: 5,293,592
[45] Date of Patent: Mar. 8, 1994

[54] DECODER FOR PIPELINED SYSTEM HAVING PORTION INDICATING TYPE OF ADDRESS GENERATION AND OTHER PORTION CONTROLLING ADDRESS GENERATION WITHIN PIPELINE

[75] Inventors: Beatrice Fu, Mt. View; Patrick P. Gelsinger, Santa Clara, both of Calif.

[73] Assignee: Intel Corporatino, Santa Clara, Calif.

[21] Appl. No.: 68,834

[22] Filed: May 28, 1993

Related U.S. Application Data

[63] Continuation of Ser. No. 863,148, Apr. 2, 1992, abandoned, which is a continuation of Ser. No. 335,186, Apr. 7, 1989, abandoned.

[51] Int. Cl.⁵ .............................................. G06F 9/38
[52] U.S. Cl. .................................. 395/375; 395/800; 364/DIG. 1; 364/231.8; 364/262.4
[58] Field of Search .................................. 395/800, 375

[56] References Cited

U.S. PATENT DOCUMENTS

| | | | |
|---|---|---|---|
| 4,080,648 | 3/1978 | Asano et al. | 395/375 |
| 4,325,120 | 4/1982 | Colley et al. | 364/200 |
| 4,415,969 | 11/1983 | Bayliss et al. | 364/200 |
| 4,574,344 | 3/1986 | Harris et al. | 395/800 |
| 4,620,275 | 1/1986 | Wallach et al. | 364/200 |
| 4,812,972 | 3/1989 | Chastein et al. | 364/200 |
| 4,868,742 | 9/1989 | Gant et al. | 364/200 |
| 4,873,629 | 11/1989 | Harris et al. | 364/200 |
| 4,890,218 | 12/1989 | Bram | 395/375 |
| 5,109,495 | 4/1992 | Fite et al. | 395/375 |

FOREIGN PATENT DOCUMENTS

| | | |
|---|---|---|
| 0124402 | 11/1984 | European Pat. Off. |
| 0240606 | 10/1987 | European Pat. Off. |
| 2059124 | 4/1981 | United Kingdom |
| 2169115 | 7/1986 | United Kingdom |

*Primary Examiner*—Thomas C. Lee
*Assistant Examiner*—L. Donaghue
*Attorney, Agent, or Firm*—Blakely, Sokoloff, Taylor & Zafman

[57] ABSTRACT

An improved instruction decoder is described which uses parallel stages which operate in a pipeline fashion. The decoder is particularly useful in a microprocessor which has variable length instructions. The first stage decodes the OP code and register and address mode specifier fields while the second stage directs the sequencing of address calculations. The first two lines of microcode are provided by the first stage as well as a look up to microcode in the microcode memory.

11 Claims, 4 Drawing Sheets

FIG_1

FIG_3

FIG_4

FIG_5

| CYCLE | 1 | 2 | 3 | 4 | 5 | 6 | 7 | 8 | 9 | 10 |
|---|---|---|---|---|---|---|---|---|---|---|
| PREFETCH | 11 | 12 | 13 | 13 | 13 | 14 | 15 | — | 16 | |
| DECODE | 10 | 11 | 12 | 13 | 13 | 13 | 14 | 15 | — | |
| EXECUTION SET UP | 9 | 10 | 11 | 12 | — | — | 13 | 14 | 14 | 15 |
| EXECUTION | 8 | 9 | 10 | 11 | 12 | — | — | 13 | — | |
| WRITE BACK | 7 | 8 | 9 | 10 | 11 | 12 | | | | |

DECODER FOR PIPELINED SYSTEM HAVING PORTION INDICATING TYPE OF ADDRESS GENERATION AND OTHER PORTION CONTROLLING ADDRESS GENERATION WITHIN PIPELINE

This is a continuation of application Ser. No. 07/863,148, field Apr. 2, 1992, now abandoned, which is a continuation of application Ser. No. 07/335,186, filed Apr. 7, 1989, now abandoned.

BACKGROUND OF THE INVENTION

1. Field of the Invention

The invention relates to instruction decoding apparatuses, particularly those employed in microprocessors.

2. Prior Art

Microprocessors, as well as other computers, must often employ a decoder which decodes macro level instructions. In effect, the instruction is interpreted by the decoder and the decoder determines what must be done in the processor to execute the instruction. In many cases the microprocessor includes a memory for storing micro level instructions (microcode) and the decoder provides a look-up to the microcode.

In some microprocessors, macro level instructions are of fixed length (e.g., 32 bits) while in others, instructions can be of different lengths. It is a much easier task to decode instructions of fixed length, since for instance, the decoder knows where to find certain fields in the instruction. In contrast, with variable length instructions, an immediate data field, for example, may or may not be present and its starting point in the instruction will vary.

The Intel 386 microprocessor (Intel and 386 are trademarks of Intel Corporation) is an example of a microprocessor with variable length instructions. An instruction can be one byte wide, such as some MOVE instructions. Instructions can be up to 8 bytes wide (with no prefix). Moreover, with an instruction prefix or override, the length of the instruction can be substantially longer (e.g., 15 bytes). A single decoder to decode these variable length instructions in a single pass would be relatively complex, and perhaps more importantly, would consume a relatively large substrate area.

In the Intel 386 the variable length instructions are decoded over the course of several computer cycles. First the instruction prefix is examined followed by other fields. Execution of the instructions begins after complete decoding. With many instructions, the Intel 386 requires several cycles for decoding; for example, LOAD requires four cycles for the instruction to be decoded, STORE requires two cycles; JUMP, three cycles to 4.25 cycles. On the average approximately three cycles are required before an instruction is fully decoded. As will be seen with the present invention, these times are greatly reduced because of pipelining and the manner in which the instruction is decoded. Decoding time drops to an average of approximately 1.8 cycles.

The present invention is intended to be used in a microprocessor which is an improved version of the Intel 386 microprocessor. The Intel 386 microprocessor is described in numerous printed publications. The programming for this microprocessor is described in *Programming the 80386*, by Crawford and Gelsinger, published by SYBEX, 1987.

SUMMARY OF THE INVENTION

An improvement is described for a microprocessor which has the storage means for storing prefetched instructions and decoding means for decoding the instructions where the instructions are of different lengths. The improvement comprises the use of a decoding means which includes two stages or sections. The first of the sections decodes a first field of one instruction simultaneously while the second of the sections is setting up execution based on a second field of the preceding instruction. Put another way, the first and second sections pipeline the instructions and operate on them in parallel.

In the currently preferred embodiment, the first section decodes the OP code, and bits representing the address mode, scaling factor, and base and index registers. The second section controls use of the address displacement and immediate data field. The first section generates pointers to the storage means which allows each of the sections to receive the correct fields of the instructions. Each section can receive any byte from the storage means.

Other aspects of the present invention will become apparent from the detailed description of the invention.

DETAILED DESCRIPTION OF THE PRESENT INVENTION

An instruction decoding unit for a microprocessor particularly useful in conjunction with prefetched instructions is described. In the following description, numerous specific details are set forth such as specific number of bits, etc., in order to provide a thorough understanding of the present invention. It will be obvious, however, to one skilled in the art that the present invention may be practiced without these specific details. In other instances, well-known processing techniques, decoding techniques and circuits have not been set forth in detail in order not to obscure the present invention in unnecessary detail.

The present invention resulted during the design of the next microprocessor in the Intel 286 and 386 family of microprocessors. For this reason, an understanding of the Intel 386 microprocessor may be helpful in fully appreciating the significance of the present invention. In addition to the numerous publications available on this microprocessor, its operation is described in *Programming the 80386*, by Crawford and Gelsinger, published by SYBEX, 1987.

OVERVIEW OF THE MICROPROCESSOR IN WHICH THE PRESENT INVENTION IS EMBODIED

The microprocessor in which the present invention is embodied is a 32-bit microprocessor fabricated with complementary metal-oxide-semiconductor (CMOS) technology. It includes on a single substrate not only those units associated with a central processing unit (CPU), but additionally a cache memory and floating point unit. In part because of the improvements obtained by the instruction decoding unit of the present invention, single cycle instruction execution is realized for many instructions.

Figure 1:
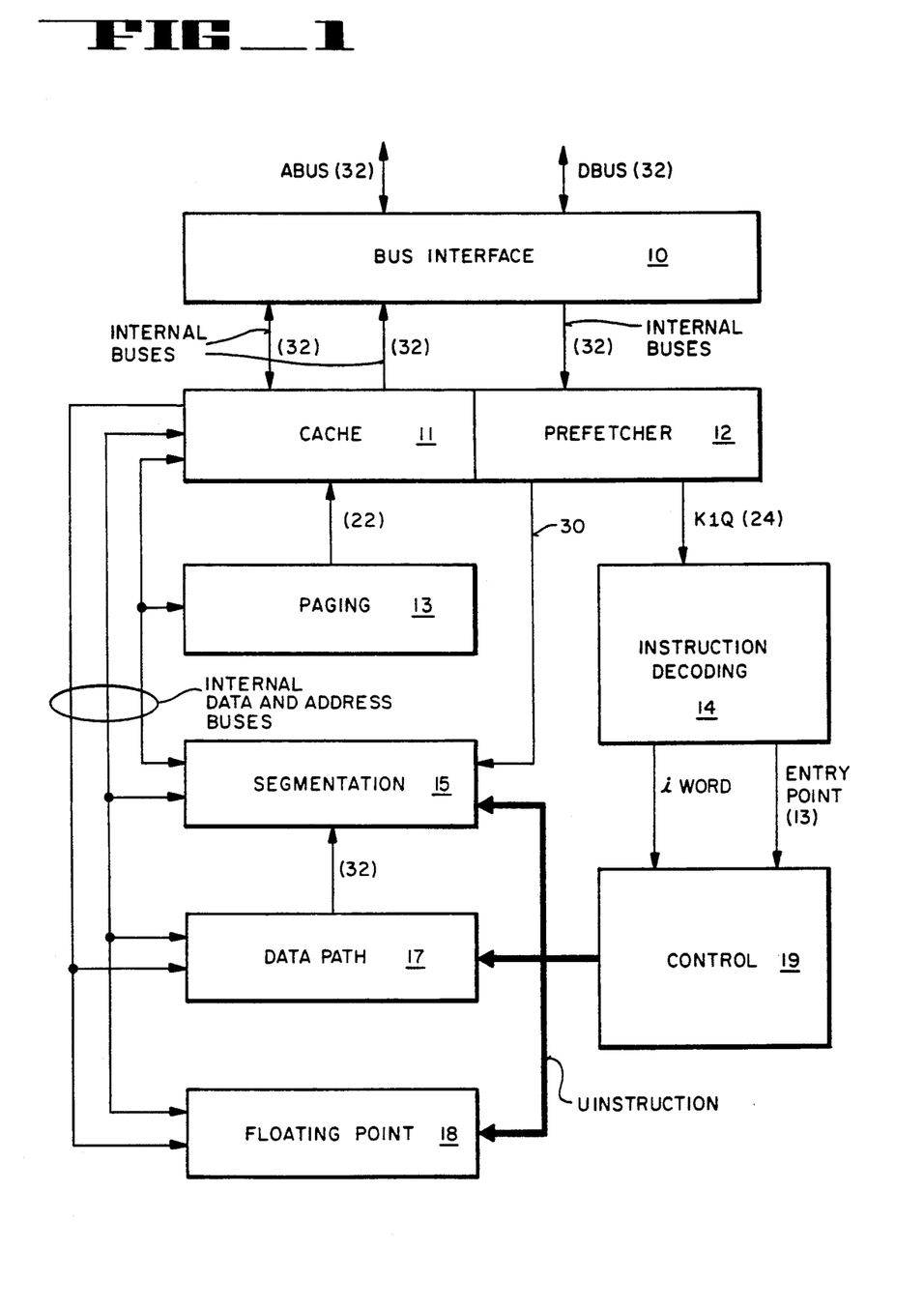
FIG. 1 is a general block diagram of the microprocessor in which the present invention is used.

Referring to FIG. 1, the main units of the microprocessor are illustrated such as the bus interface unit 10. This unit provides the necessary interface between the internal buses of the microprocessor, and in particular the cache memory 11 and prefetcher 12 and the external buses responsible for fetching data from the external data memory system. External 32-bit address bus and 32-bit data bus are used. The particular interface unit 10 used in the currently preferred embodiment of the microprocessor is not critical to the present invention. This unit is described in copending application, Ser. No. 227,078, filed Aug. 1, 1988, entitled Microprocessor Bus Interface Unit, now U.S. Pat. No. 5,073,969 assigned to the assignee of the present invention. For purposes of the present invention it should be noted that prefetched instructions stored in the prefetcher 12 can be communicated to this prefetcher from the bus interface unit 10 or from a cache memory 11.

The paging unit 13 and segmentation unit 15 generally are similar to those employed in the Intel 386. The timing has been changed, however, to support one clock execution. The interconnection of a segmentation unit with the prefetcher 12 and other relationships with the instruction decoder unit 14 are described in conjunction with FIG. 2.

In general, the instruction decoding unit decodes the incoming instructions, and as will be seen, is different from the instruction decoding unit of the Intel 386 in that it provides parallel decoding and pipelining. It is implemented with two stages or sections of pipeline decoding to yield one decoded instruction per computer clock cycle for most instructions. The first section basically decodes the Op code, address mode, scaling factor and base and index register bits (collectively sometimes referred to as the register and address mode specifier), while the second stage primarily directs use of the address displacement or intermediate data fields.

The control unit 19 contains a memory which stores the microcode instructions (microcode) for the microcomputer. It shares control of the microprocessor with the instruction decoding unit since as will be described, the first line of microcode is provided by the instruction decoding unit 14. The control unit 19 is responsible for instruction boundary processing, such as interrupt/exception arbitration, and the halting of the instruction decoding unit 14 when necessary. The control unit 19 handles most of the freeze conditions, such as cache memory miss, etc.

The data path unit 17 is the main execution data path for the microprocessor. It contains the arithmetic logic unit, register file, barrel shifter, constant ROM and flags.

The microprocessor also includes a floating point unit 18. This unit contains logic to execute the floating point instructions.

DESCRIPTION OF THE PRESENTLY PREFERRED EMBODIMENT OF THE PRESENT INVENTION

Figure 2:
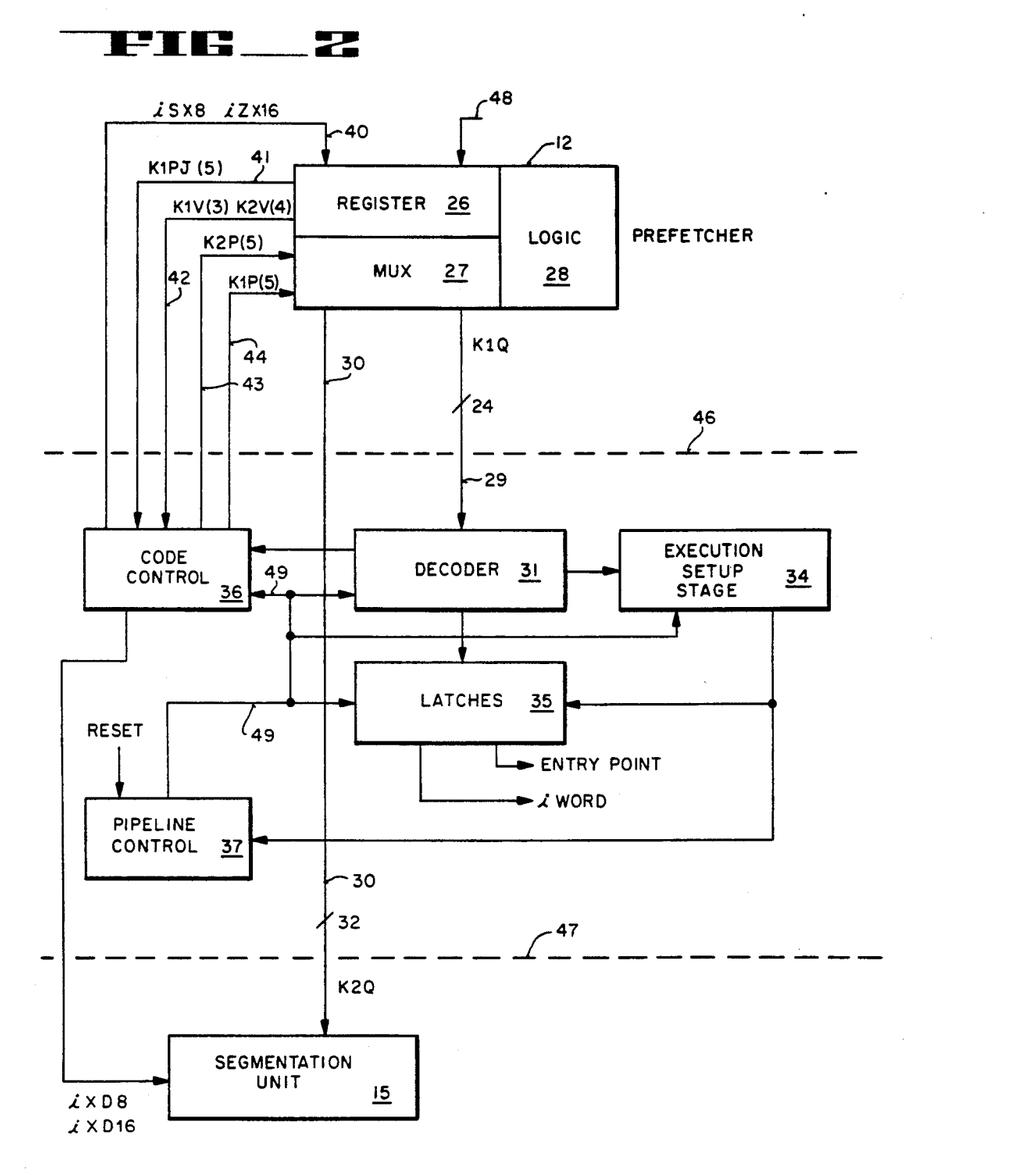
FIG. 2 is a block diagram showing the instruction decoding unit of the present invention and its connection to the prefetcher and a segmentation unit.

The instruction decoding unit 14 of FIG. 1 is generally shown in FIG. 2 between the dotted lines 46 and 47. This unit and certain circuitry in the prefetcher 12 operate together to provide the advantages of the present invention.

The prefetcher 12 includes three major sections: register 26, multiplexer 27 and associated logic 28. The register or latch 26 receives prefetched instructions either from the cache memory or the bus interface unit. This is shown generally in FIG. 2 by bus 48. The register 26 is 32 bytes wide in the currently preferred embodiment. The instructions stored in the register 26 can be coupled either to bus 29 (K1Q) or to bus 30 (K2Q). These instructions are coupled to these buses through the multiplexer 27. Any adjacent three bytes in register 26 may be coupled to the bus 29. Any adjacent four bytes may be coupled to the bus 30.

The signals on lines 44 from the code control circuit 36 provide a pointer (K1P) to the first byte of the 24-bit field coupled to bus 29. The "(5)" following "KIP" indicates five bits rae used to designate this pointer since this is what is needed to designate a single byte of the 32 bytes stored in register 26. A second pointer (K2P) coupled to the prefetcher 12 on lines 43 points to the first byte of the 32-bit field coupled to bus 30. As will be described later, the fields coupled to buses 29 and 30 can overlap, that is, bytes initially coupled to the bus 29 during one clock cycle may in a subsequent clock cycle be coupled to bus 30.

The 5 bits coupled to the prefetcher 12 on lines 41 (K1PJ) provide a jump pointer to the code control circuit 36. This occurs after new instructions (following a JUMP command) have been loaded into the register 26. This pointer indicates to the control circuit 36 the starting byte of the new instructions. The signals on lines 42 (K1V and K2V) indicate whether the K1Q data and K2Q data is valid. The signals on lines 40 (isx8 and izx16) are control signals for controlling coupling of intermediate data fields.

The decoder 31 is an ordinary programmed logic array (PLA) circuit (which includes logic gates) programmed to do ordinary decoding. As will be seen, the OP code and register and address mode specifier are always coupled to the decoder 31 from register 26 (except when the instruction included a prefix). From this data the decoder 31 through the code controller 36 determines the length of the fields actually needed by the decoder 31 and hence, the point at which the pointer for the K2Q bus should point within the register 26. The decoder always receives 24 bits, even when an 8 bit instruction resides in register 26. The decoder 31 couples signals to the execution set up stage 34 which identifies the type of address needed to satisfy the instruction. As will be seen, the decoder 31 and execution set up stage 34 operate in parallel, however, decoder 31 operates on one instruction while the stage 34 is operating on the preceding instruction.

The latches 35 which are coupled to the output of the decoder 31 allow signals resulting from the decoding to be clocked through the latches 35 and timed with subsequent "decoding" being performed by stage 34. The latch output includes the specific ALU control signals and source/destination register enable signals. The output of the latch includes the entry point (look up) of the "first" line of microcode in the microcode memory of unit 19.

In reality, however, the entry point points to the third effective line of microcode since the decoder 31, with the latch 35 provides the first two lines of the microcode. For example, this occurs for a store instruction or when the decoder 31 sets up an address calculation during one cycle. During the following clock cycle the second line of microcode is provided by the latch 35 to initiate a bus cycle (receive from memory). For the next clock cycle the third line of code is provided by the microcode memory (control unit 19 of FIG. 1). This third line of code is selected based on an entry point provided by the latches 35 at the time when the latches 35 is providing the first line of microcode.

As currently implemented, all instructions use at least one line of microcode from the control unit 19. In some cases, this microcode simply indicates the completion of an instruction cycle. Also in many cases the first line of microcode from the decoder 31 is a "NOOP".

Execution set up stage 34 which may be looked at as the second stage of decoding, as mentioned, primarily controls address generation, or more specifically, the sequencing for the address generating. For this reason, it is implemented primarily as a state machine. The actual address calculations occur within the segmentation unit 15. The decoder 31 provides the linear address requirements to the stage 34 and from this stage 34 determines how many cycles will be needed for the instruction. In general, one cycle is needed if there is only a base and displacement, and two cycles are needed if there is a base, factor for scaled index address and displacement. A load signal and field sizing signals are coupled to segmentation unit 15 via the control circuit 36.

The code control unit 36 includes a state machine, adder and counter and associated logic. Signals are coupled from the decoder 31 to the circuit 36 to indicate the type of instruction which has been decoded. From this information, the code control unit 36 determines through the adders and counters where the pointers K1P and K2P should point. The control performed by circuit 36 will become more apparent when the pointers are discussed in conjunction with FIG. 6.

The code control circuit 36 also performs other functions in the currently preferred embodiment, for instance, violation bits which would indicate segmentation violations, or other violations are detected by the prefetcher 12 and coupled to the control unit 36. The control circuit 36 may also in some instances, determine the nature of the violation.

The pipeline control circuit 37 is also a state machine which provides overall control of the pipelining to the instruction decoding unit. This circuit recognizes from signals coupled to it from decoder 31 when an instruction includes a prefix, then determines the number of additional cycles needed to handle the particular instruction. For instance, as will be described in conjunction with FIG. 5, several cycles may be needed. The circuit 34 controls these additional cycles. The pipeline control circuit 37 on lines 49 provides a "advance signal" to the decoder 31 and execution set up stage 34, a "flush pipeline" or reset signal, and a signal to indicate when a particular stage has completed operation on an instruction.

The entire circuit of FIG. 2 is realized with ordinary circuits. Control signals not required for an understanding of the present invention are not illustrated in FIG. 2. Additionally, functions not required for an understanding of the present invention (e.g., test functions) are not shown in order to facilitate an understanding of the invention.

INSTRUCTIONS OPERATED UPON BY THE APPARATUS OF THE PRESENT INVENTION

Figure 3:
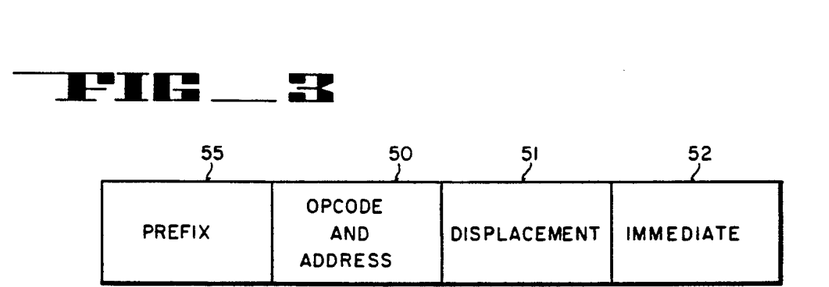
FIG. 3 illustrates the most general format of an instruction decoded by the invented apparatus.

FIG. 3 illustrates the general format of instructions for the Intel 386, these being the instructions decoded in the currently preferred embodiment of the invented decoding apparatus. Instructions include an OP code and in some cases a separate address field 50, displacement field 51 and immediate field 52. The lengths of these fields vary as will be discussed in conjunction with FIG. 4. In some cases, an additional prefix 55 is used.

Figure 4:
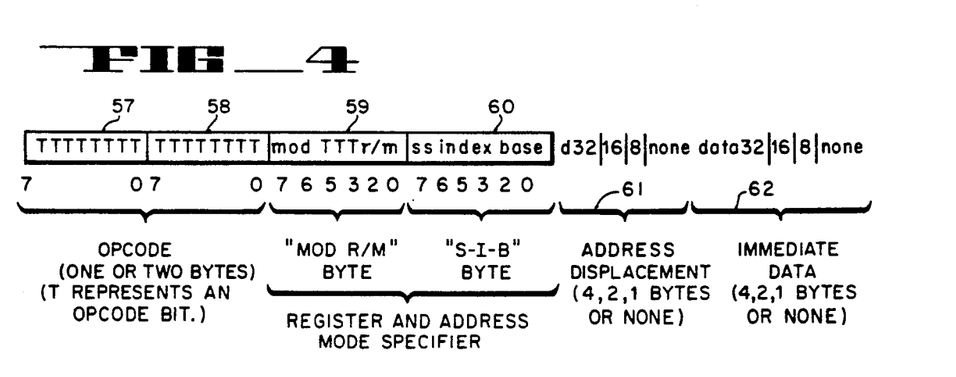
FIG. 4 is a more detailed diagram illustrating the format of an instruction and illustrates the variable length fields of instructions.

In FIG. 4, a typical instruction is illustrated. The OP code field may be either one or two bytes in length. In some cases, the entire instruction consists of only a single byte where, for example, the first five bits indicate a MOVE and the last three bits, a register designation. A typical OP code is shown as having two bytes, 57 and 58, in FIG. 4. The address mode byte 59 indicates the address mode and "register/memory"; byte 60 includes the scale factor for scaled index addressing modes (SS), the general register to be used as an index register (index) and the general register to be used as a base register. The bytes 59 and 60 are referred to as the register and address mode specifier. The field 61 is the address displacement and this field may not be present in all instructions, or it could be 1, 2 or 4 bytes long. Similarly, the immediate data field 62 may not be present in all instructions and this field may be 1, 2 or 4 bytes long. Other variations occur, for instance, segment register specifiers for certain registers may occur within the OP code fields, or bits may be used for conditional instructions to specify a condition asserted or a condition negated.

Importantly, from FIG. 4 it should be noted that the first three bytes of all instructions (except of those having a prefix) contain sufficient information to determine the instruction being requested and the total length of the instruction. In each case, these three bytes are coupled to the decoder 31. From the remaining bytes of each instruction, an address can be calculated by the segmentation unit 15 of FIG. 2. The first three bytes contain the information needed for the decoder 31 to determine the address mode and how many cycles will be needed to compute the address. For instance, it was noted that if a base, index and displacement are present, generally two cycles are required.

TIMING DIAGRAMS FOR FIGS. 5 AND 6

Figure 5:
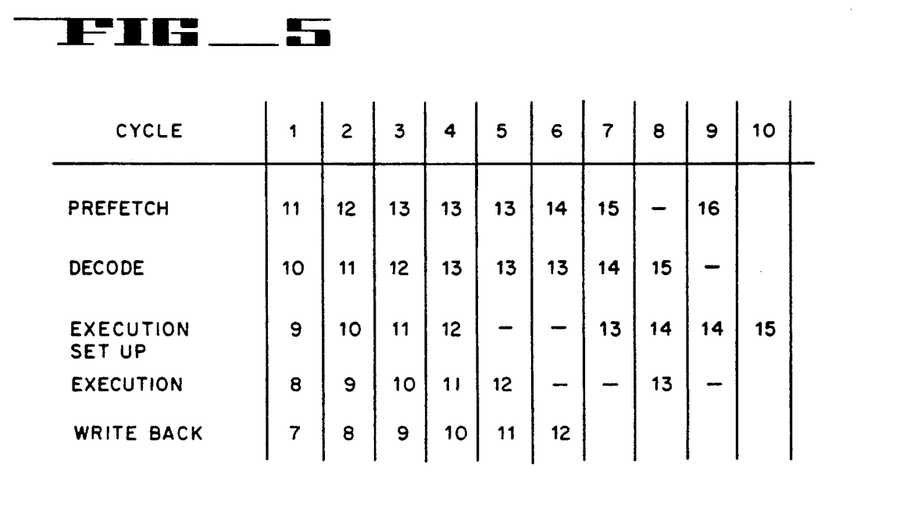
FIG. 5 is a diagram used to illustrate the timing and pipeline flow associated with the present invention.

The general pipelining of the invented apparatus can be generally understood from FIG. 5. Across the top of the chart the cycle is shown. Each cycle corresponds to a computer clock cycle. For example, the internal clock cycles for the microprocessor may occur at a rate of 25 mHz. The lefthand column indicates the stages in the pipeline. The numbers contained in the chart represent an instruction number. For instance, during cycle 1, instruction 11 is transferred from the prefetcher 12, that is, it is coupled to the decoder 31 of FIG. 2. During the same cycle (that is, simultaneously with this transfer) the decoder 31 is decoding instruction 10, the instruction that preceded instruction 11. Similarly, during this period of time the execution set up stage 34 of FIG. 2 is controlling the sequencing of address calculations for instruction 9. At the same time execution is occurring for instruction 8 and write back is occurring for instruction 7. (Not all instructions have a write back, however, some single byte instructions do require write back.) As can be seen during cycle 2; transfer to decoder 31 occurs for instruction 12, decoder 31 is decoding instruction 11, and the execution set up unit is operating on instruction 10.

In some cases, as mentioned, a prefix (prefix 55 of FIG. 3) may be present. Assume that the decoder during cycle 3 upon decoding the first 24 bits of instruction 13 determines that a prefix is present. This information is communicated to the pipeline control circuit 37 and this circuit then determines how many cycles will be required to transfer the entire prefix, OP code, and register and address mode specifier to the decoder 31. As illustrated in FIG. 5, it is assumed that this occurs during cycles 3, 4 and 5. Decoding occurs during cycles 4, 5 and 6 and execution set up occurs during cycle 7. Execution is shown occurring for this instruction during cycle 8. During cycles 5 and 6, the execution set up stage 34 is inoperative; similarly, the execution stage is shown as inoperative during cycles 6 and 7.

Instruction 14 is shown as being transferred to decoder 31 during cycle 6, decoded by decoder 31 during cycle 7, but then requiring two cycles, 8 and 9, for address calculation. This, as mentioned, would occur where the address includes a base, index and displacement. Since two cycles are required, as indicated during cycle 8, no transfer occurs to the decoder 31, however, during cycle 9, instruction 16 is transferred to the decoder.

Figure 6:
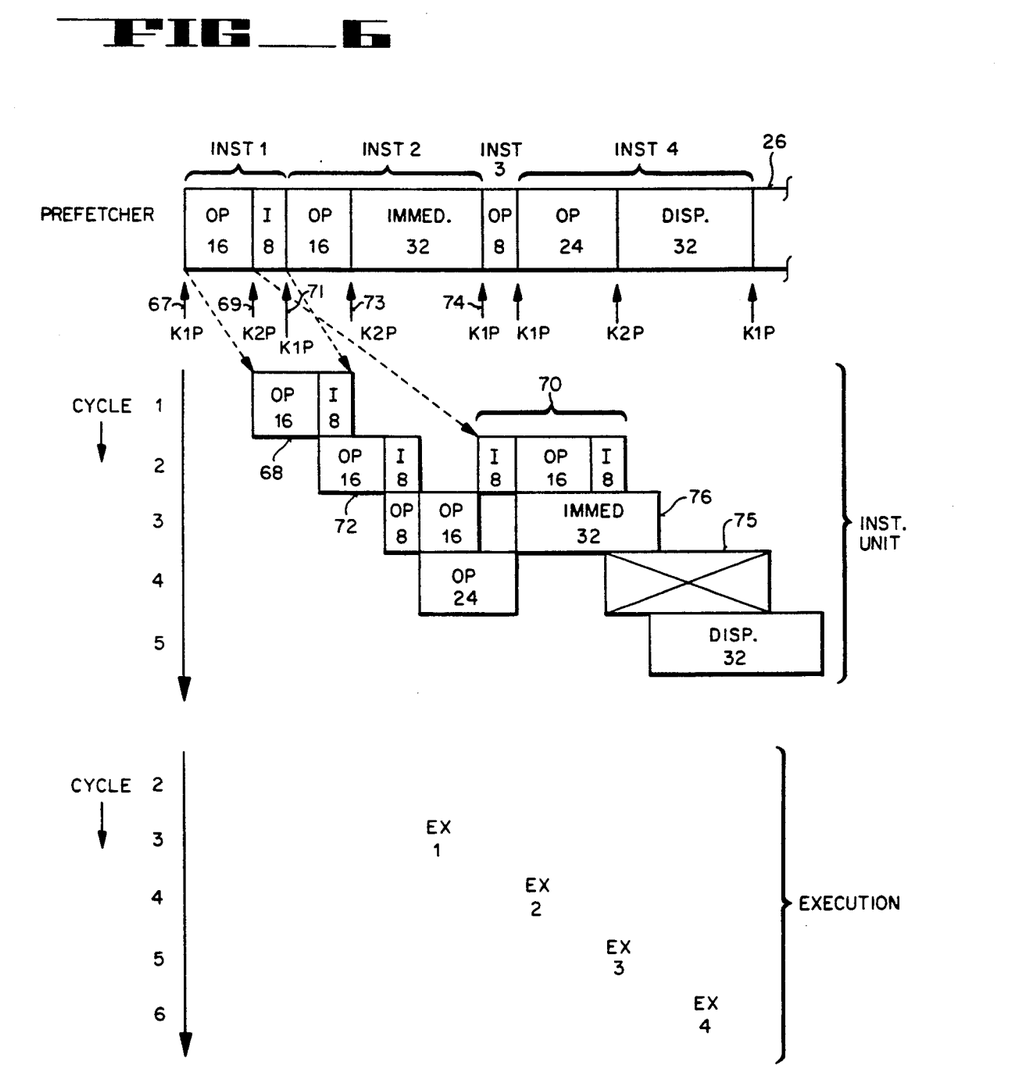
FIG. 6 is a more detailed diagram illustrating the timing and instruction flow associated with the present invention.

In FIG. 6, a portion of the register 26 of FIG. 2 illustrated. It is assumed that several instructions are stored in this register, specifically, instructions one through four. Instruction one is assumed to have a two byte OP code and register and address mode specifier. (For purpose of FIG. 6, the designation "OP" indicates both the actual OP code and register and address mode specifier fields of FIG. 4). Instruction one also has an 8 bit immediate field. Instruction two has a 16 bit OP code and a 32 bit immediate field. Instruction three has only an 8 bit OP code. Instruction four has a 24 bit OP code, and 32 bit displacement field. Initially, the K1P pointer applied to the prefetcher 12 (pointer 67) points to the first byte in the register 26. The first 24 bits in the register are therefore transferred to the decoder 31. This field is indicated to the right of cycle 1 by the number 68. Decoder 31 upon decoding this field determines that the first 16 bits are the OP code and provides the appropriate signals to initiate the execution of this code (generally to the latch 35). Through the code control circuit 36 it is determined that the 1K2P pointer 69 should point to the beginning of the immediate field in instruction one. This pointer causes the four bytes following this field to be transferred under control of the set up stage 34. The field is indicated by bracket 70 to the right of cycle 2 in FIG. 6. The code control circuit 36 also provides pointer 71 so that during cycle 2 the 24 bits following pointer 71 are transferred to the decoder 31. This field is generally indicated by the number 72. Note once again that 8 bits of the immediate field of instruction 2 are transferred to the decoder but these bits are, in effect, ignored. During the next cycle, the entire immediate field for instruction two is transferred since the pointer 73 is set at the beginning of this field. (Displacement fields are transferred to the segmentation unit and immediate fields are transferred within the cache unit.) The field is shown for cycle 3 with the number 76. The control circuit 36 next provides pointer 74 causing the 24 bits following pointer 74 to be transferred during cycle 3 to the decoder 31. Since this instruction has no intermediate field or displacement field, a 1K2P pointer for instruction three is not needed. This is generally indicated by the number 75 for cycle 4. This process continues as shown in FIG. 6 for instruction four with the control circuit 36 providing the pointers and with the appropriate fields being transferred.

In the lower part of FIG. 6 the execution of the instructions is shown. During cycle 3, instruction one is executed. During cycle 4, instruction two is executed, etc.

Thus, an improved instruction and decoding apparatus has been disclosed which provides improved performance particularly for a microprocessor that uses variable length instructions.

We claim:

1. In a microprocessor having storage means for storing prefetched a plurality of instructions, decoding means for decoding the plurality of instructions from said storage means where at least two of the plurality of instructions are of different lengths and an execution unit for executing the plurality of instructions, wherein each of said plurality of instructions comprised of a plurality of bytes and has at least a first and second field, an improvement wherein said decoding means includes at least two sections, the first of said sections coupled to receive n-bytes of said plurality of instructions and decoding a first field of one of said plurality of instructions from said n-bytes, said first field having information used by said first section to provide a first pointer to said storage means for selection of the second field of said one of said plurality of instructions from said storage means and to provide a second pointer to said storage means for selection of the first field of the instruction following said one of said plurality of instructions, said second field having information used by said second section for address generation, wherein said first section includes means for indicating to said second section the type of address calculation to be performed for said one of said instructions; and said second section being coupled to receive m-bytes of instruction data from the storage means as indicated by said first pointer and to cause said setting up of said one of said instructions with said second field from said storage means, wherein said second section controls address calculations in response to said first section indicating the type of address calculation to be performed for said one of said instructions so that address calculations are sequenced, such that while said second section causes said setting up of said one of said instructions, said first section is decoding said first field of said instruction following said one of said plurality of instructions, and wherein said second section includes means to synchronize results from said first section and from said second section, such that said one of said plurality of instructions is provided after decoding to said execution unit for execution while said second section sequences address calculations for the instruction following said one of said plurality of instructions, such that the first of said sections, the second of said sections and said execution unit operate synchronously.

2. The improvement defined by claim 1 wherein said first field includes the OP code and register and address mode specifier.

3. The improvement defined by claim 1 wherein said microprocessor uses microcode and includes memory for storing at least some of said microcode, said first section providing a look-up for said microcode.

4. The improvement defined by claim 3 wherein said first section for certain of said instructions provides at least one line of microcode.

5. The improvement defined by claim 1 wherein said first section providing at least a first line of microcode for some of said instruction and a look up to other microcode.

6. In a microprocessor having an instruction decoding unit, a register for storing a plurality of instructions which are coupled to said unit, and an execution unit for executing said plurality of instructions, each of said plurality of instructions having a plurality of bytes, said microprocessor operating upon instructions of different length, an improvement comprising:

said unit having a first and second stages, said first stage receiving a plurality of instruction bytes and decoding the OP code, and register and address mode specifier (first field) of one of said plurality of instructions during a first computer cycle, said first stage also signaling said second stage to the address displacement or immediate data field of said one of said plurality of instructions and determining the location of the OP code and register and address mode specifier (first field) of the instruction following said one of said plurality of instructions, wherein data in the address displacement or immediate data field of said one of said plurality of instructions are received by the second stage directly from the register, and further wherein said first stage includes means for indicating to said second stage the type of address calculation to be performed for said one of said plurality of instructions, said second stage controlling use of said address displacement or immediate data field (second field) of said one of said plurality of instructions and responsive to said first stage indicating the type of address calculation to be performed for said one of said plurality of instructions during a second computer cycle, said second cycle following said first cycle in time, such that address calculations are sequenced during said second cycle while said first stage is decoding the OP code, and register and address mode specifier (first field) of the instruction following said one of said plurality of instructions, and wherein said unit includes means to synchronize results from said first stage and from said second stage, such that said one of said plurality of instructions is provided after decoding to said execution unit for execution while said second stage sequences address calculations for the instruction following said one of said plurality of instructions, such that said first and second stages and said execution unit operate synchronously.

7. The improvement defined by claim 6 wherein said first stage is coupled to receive said first field under control of a first pointer and said second stage is coupled to sequence use of said second field under control of a second pointer, said first and second pointers being generated by signals from said first stage.

8. The improvement defined by claim 7 wherein said first stage initiates execution of certain of said instructions.

9. The improvement defined by claim 6 wherein said microprocessor uses microcode and includes memory for storing at least some of said microcode and said first stage providing a look-up for said microcode through a latch.

10. The improvement defined by claim 9 wherein said first stage for certain of said instructions provides two lines of microcode.

11. The improvement defined by claim 10 wherein said second stage controls bus cycle initiation.

* * * * *

UNITED STATES PATENT AND TRADEMARK OFFICE
CERTIFICATE OF CORRECTION

PATENT NO. : 5,293,592
DATED : Mar. 8, 1994
INVENTOR(S) : Beatrice Fu, et al

It is certified that error appears in the above-indentified patent and that said Letters Patent is hereby corrected as shown below:

Col. 4, Line 28    Delete "rae" insert--are--

Signed and Sealed this

Tenth Day of October, 1995

Attest:

BRUCE LEHMAN

Attesting Officer    Commissioner of Patents and Trademarks